United States Patent
Szapiel et al.

(10) Patent No.: US 12,117,270 B1
(45) Date of Patent: Oct. 15, 2024

(54) EXTERNAL MODULE AND METHOD FOR ELECTRONIC COMPENSATION OF PARALLAX ERRORS IN DIRECT-VIEW RIFLE SCOPES

(71) Applicant: RAYTHEON CANADA LIMITED, Ottawa (CA)

(72) Inventors: Stan Szapiel, Midland (CA); Kevin Burgess Wagner, Midland (CA)

(73) Assignee: RAYTHEON CANADA LIMITED, Ottawa (CA)

( * ) Notice: Subject to any disclaimer, the term of this patent is extended or adjusted under 35 U.S.C. 154(b) by 0 days.

(21) Appl. No.: 18/202,494

(22) Filed: May 26, 2023

(51) Int. Cl.
*F41G 3/00* (2006.01)
*F41G 1/01* (2006.01)
*F41G 1/38* (2006.01)

(52) U.S. Cl.
CPC ............... *F41G 3/005* (2013.01); *F41G 1/01* (2013.01); *F41G 1/38* (2013.01)

(58) Field of Classification Search
CPC ... F41G 3/00; F41G 3/005; F41G 1/00; F41G 1/01; F41G 1/38
See application file for complete search history.

(56) References Cited

U.S. PATENT DOCUMENTS

2015/0124243 A1* 5/2015 Stockdill .................. G01C 3/04
42/122

\* cited by examiner

*Primary Examiner* — Laura A Gudorf
(74) *Attorney, Agent, or Firm* — NORTON ROSE FULBRIGHT CANADA LLP

(57) ABSTRACT

An example rifle includes a rifle scope including a front optics and back optics for imaging a remote object. A parallax compensating device is coupled to the rifle scope. The parallax compensating device determines a zero-parallax setting distance to compensate parallax errors associated with imaging a remote object. The parallax compensating device removes, using the zero-parallax setting distance, the parallax errors dynamically in real time even if a user's head or eyes are misaligned and temperature at the rifle scope or surrounding environment.

20 Claims, 3 Drawing Sheets

EXTERNAL MODULE AND METHOD FOR ELECTRONIC COMPENSATION OF PARALLAX ERRORS IN DIRECT-VIEW RIFLE SCOPES

BACKGROUND

When using personal targeting systems, such as rifle scopes, motion parallax can cause errors in aiming and lead to missed targets. The target's location influences this parallax error in relation to the aiming reticle, which is projected through the front optics of the scope. Additionally, parallax error can be affected by changes in local temperature. Completely and quickly eliminating parallax errors in all operational conditions remains an important and unsolved practical issue.

SUMMARY

According to one aspect of the subject matter described in this disclosure, an example rifle is provided. The rifle includes a rifle scope including a front optics and back optics for imaging a remote object. A parallax compensating device is coupled to the rifle scope. The parallax compensating device determines a zero-parallax setting distance to compensate parallax errors associated with imaging a remote object. The parallax compensating device removes, using the zero-parallax setting distance, the parallax errors dynamically in real time even if a user's head or eyes are misaligned and temperature at the rifle scope or surrounding environment.

In some implementations, the front optics may include an objective lens and other lenses and/or prisms located between the objective lens and a reticle. The back optics may include an eyepiece. The front optics may include at least one temperature sensor for determining internal or external temperature data of the rifle scope or surrounding environment. The parallax compensating device may include a processing system to determine the zero-parallax setting distance based on target range data of the remote object, temperature data of the rifle scope or surrounding environment, and calibrated data from at least one calibrated look-up table stored in the processing system. The parallax compensating device includes an external tunable optics module (TOM) having refractive plates. The TOM may be coupled to at least one actuator to move the refractive plates. The processing system may send signals to the at least one actuator to move the refractive plates to tune its refractive power to reflect the determined zero-parallax setting distance. The parallax compensation device may cancel both temperature-dependent and temperature-independent sources of the parallax error.

According to another aspect of the subject matter described in this disclosure, an example method for dynamic parallax compensation is provided. The method includes the following: providing a front optics and a back optics of an optical system for imaging a remote object; coupling a parallax compensating device to the front optics; determining, using the parallax compensating device, a zero-parallax setting distance to compensate parallax errors associated with imaging a remote object; and removing, using the zero-parallax setting distance, the parallax errors dynamically in real time even if a user is misaligned and temperature at the front optics or the optical system changes.

In some implementations, the front optics may include an objective lens and other lenses and/or prisms located between the objective lens and a reticle plane. The back optics may include an eyepiece. The front optics may include at least one temperature sensor for determining temperature data of the front optics, optical system, or surrounding environment.

In some implementations, the parallax compensating device may include a processing system to determine the zero-parallax setting distance based on target range data of the remote object, temperature data of the rifle scope or surrounding environment, and calibrated data from at least one calibrated look-table stored in the processing system. The parallax compensating device may include an external tunable optics module (TOM) having refractive plates. The TOM may be coupled to at least one actuator to move the refractive plates. The processing system may send signals to the at least one actuator to move the refractive plates to tune its refractive power to reflect the zero-parallax setting distance. The parallax compensation device may cancel both temperature-dependent and temperature-independent sources of the parallax error.

According to another aspect of the subject matter described in this disclosure, an example parallax compensation device is provided. The system includes a tunable optics module (TOM) for focusing at least one image of a remote target to a reticle plane of a front optics of an optical device. The TOM includes refractive plates for tuning the refractive power of the TOM and is coupled to at least one actuator. A processing device for receiving target range data and/or temperature data regarding the remote object and determining a zero-parallax setting distance from the received data to compensate for parallax error in imaging the remote object. The processing device is configured to send signals to the at least one actuator to adjust the refractive plates for tuning the refractive power of the TOM to reflect the zero-parallax setting distance to compensate for the parallax error.

In some implementations, the TOM may be positioned on the front optics of the optical device. The processing device may be an embedded processor. Each of the refractive plates may include a diffraction-limited surface.

Additional features and advantages of the present disclosure is described in, and will be apparent from, the detailed description of this disclosure.

BRIEF DESCRIPTION OF THE DRAWINGS

The disclosure is illustrated by way of example, and not by way of limitation, in the figures of the accompanying drawings in which like reference numerals are used to refer to similar elements. It is emphasized that various features may not be drawn to scale and the dimensions of various features may be arbitrarily increased or reduced for clarity of discussion.

DETAILED DESCRIPTION

Figure 1:
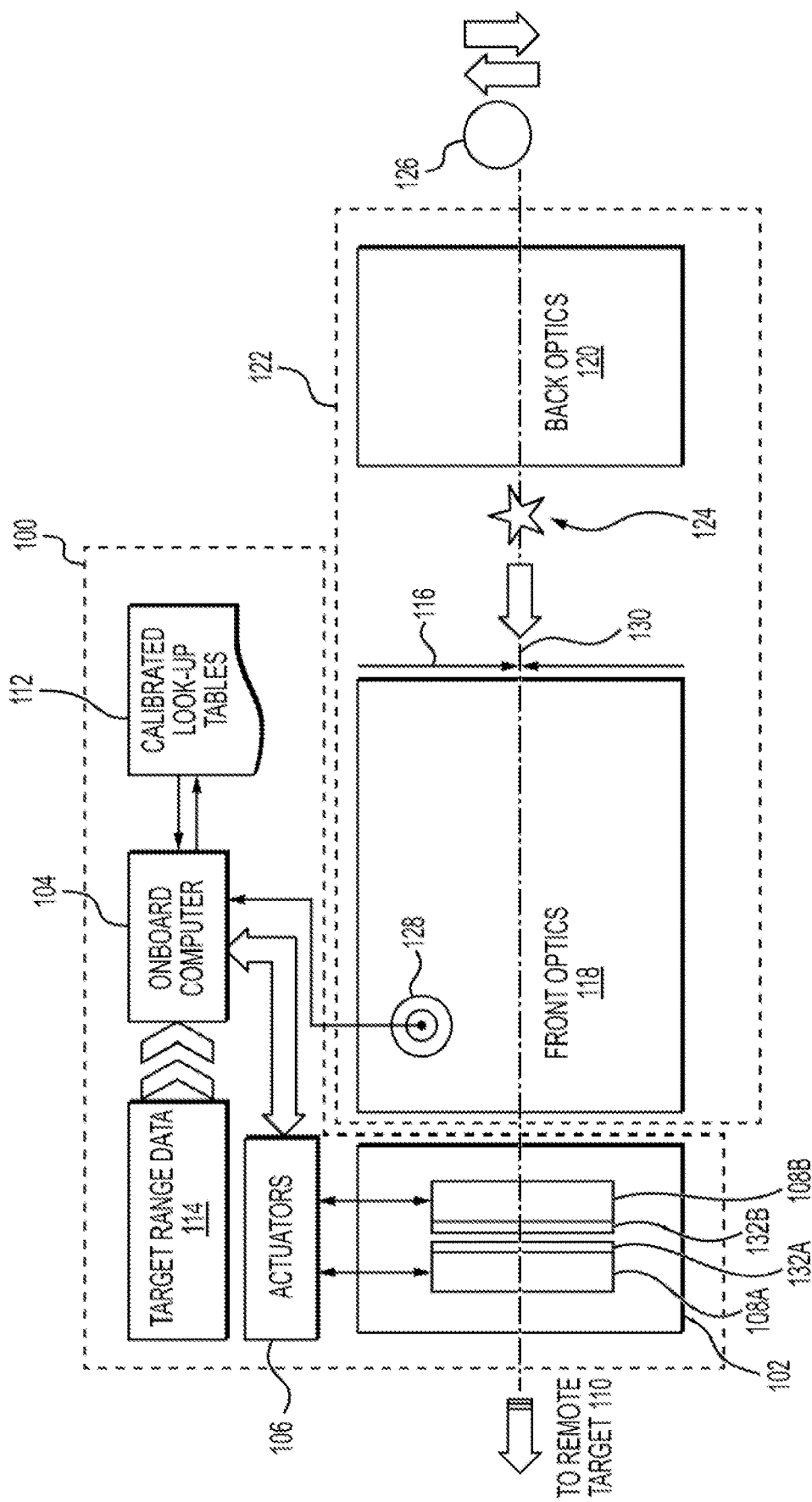
FIG. 1 is a schematic block diagram of an example parallax compensation system.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example implementations only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

This disclosure describes a system and method for compensating for parallax in rifle scopes. The system includes an external Tunable Optical Module (TOM) attached to the scope's front optics. The TOM has refractive plates that focus the image of a distant target onto the aiming reticle. An onboard computer is connected to the TOM and can access calibrated look-up tables. The onboard computer also receives temperature data from internal temperature sensors that monitor the rifle and environment and the distant target range data. The computer determines the zero-parallax setting distance and adjusts the TOM's refractive power with one or more actuators using the temperature, target range, and calibration data. As a result, the images of the distant target are focused back onto the reticle, eliminating parallax even when the operator moves their head or eyes.

FIG. 1 is a schematic block diagram of an example parallax compensation system 100. Parallax compensation system 100 is attached to the front of a rifle scope to compensate for the parallax associated with the displacement or difference in the apparent position of remote object 110 viewed along two different lines of sight and is measured by the angle or half-angle of inclination between those two lines. The parallax compensation system 100 includes a tunable optics module (TOM) 102, an onboard computer 104, and actuators 106. TOM 102 includes several refractive plates 108A and 108B to tune its refractive power to focus the images of a remote target 110.

In some implementations, refractive plates 108A and 108B may include flat surfaces 132A and 132B to tune their refractive power. Flat surfaces 132A and 132B may be freeform lenses (Alvarez type), flat diffractive surfaces, flat metasurfaces, or a combination thereof.

The refractive plates 108A and 108B can be moved by actuators 106, which follow instructions from the onboard computer 104. Actuators 106, which may include microelectromechanical systems (MEMS) actuators, convert electrical signals into mechanical movements of refractive plates 108A and 108B. These actuators can shift the refractive plates 108A and 108B vertically or rotate them to adjust the refractive power of TOM 102. Alternatively, actuators 106 can be electrostatic, electrothermal, electromagnetic, or piezoelectric.

Onboard computer 104 includes one or more processors capable of controlling and performing the required operations and memories for storing applications and relevant data. Also, onboard computer 104 includes calibrated look-up tables 112, stored in its memory and connected to TOM 102. In some implementations, onboard computer 104 may be an embedded processor or the like placed within parallax compensation system 100. In other implementations, onboard computer 104 may be external to parallax compensation system 100. In this instance, parallax compensation system 100 may include wireless capabilities to receive and send data to onboard computer 104.

Moreover, onboard computer 104 may receive target range data of remote object 110. In some instances, the target range data 114 may be GPS data of remote object 110. The target range data 114 may be from a remote source, such as an external drive or the like. To determine the zero-parallax setting distance, the onboard computer 104 requires the target range data 114, the internal temperature information of rifle scope 122, and calibration data from the calibrated look-up tables 112. The computer 104 then sends signals or commands to actuators 106 to move refractive plates 108A and 108B, which helps to reflect the zero-parallax setting distance at TOM 102. The onboard computer 104 determines the current orientation and the specific orientation of refractive plates 108A and 108B needed to reflect the determined zero-parallax setting distance. Based on the current orientation of refractive plates 108A and 108B, the signals or commands sent by onboard computer 104 to actuators 106 move the refractive plates 108A and 108B, horizontally, vertically or by rotation, to adjust the refractive power of TOM 102 to be in accordance the determined zero-parallax setting distance. This results in image 124 of the remote target 110 being in focus on the aiming reticle 116. By bringing image 124 to a focal plane 130 that contains aiming reticle 116, no parallax is observed, which eliminates parallax error.

An updater can be utilized in certain implementations to keep target range data 114 and calibrated look-up tables 112 up to date. This updater may be housed in the onboard computer 104 or accessed externally from another computer.

The rifle scope 122 has two sets of optics: front optics 118 and back optics 120. Front optics 118 consists of lenses and/or prisms between the objective and the reticle plane 116. Additionally, front optics 118 has one or more local internal temperature sensors 128 that provide the internal temperature data of front optics 118 or rifle to onboard computer 104. In this particular implementation, TOM 102 is located in front of front optic 118. In other implementations, internal temperature sensors 128 may be placed inside TOM 102.

Onboard computer 104 uses internal temperature information received from internal temperature sensors 128 in conjunction with target range data 114 and calibrated look-up tables 112 to determine zero-parallax setting distance.

Back optics 120 may include an eyepiece of the rifle scope and any additional optics for imaging a remote target 110. An operator's head or eyes 126 is positioned at a distal side of back optics 120.

Parallax compensation system 100 eliminates parallax errors caused by temperature-dependent and temperature-independent sources. It can dynamically remove parallax in real time, even if the operator's head or eyes are misaligned and the temperature changes. Moreover, parallax compensation system 100 can be easily added to any existing rifle scope without requiring extensive internal modifications or redesigning the current scope.

Although used with a rifle in this instance, the parallax compensation system 100 can also be used with other firearms with an imaging component, such as rifle scope 122. Additionally, parallax compensation system 100 can be applied to other optical systems and devices, such as telescopes. Like the example described, parallax compensation system 100 is connected to the front optics of these systems and devices.

Figure 2:
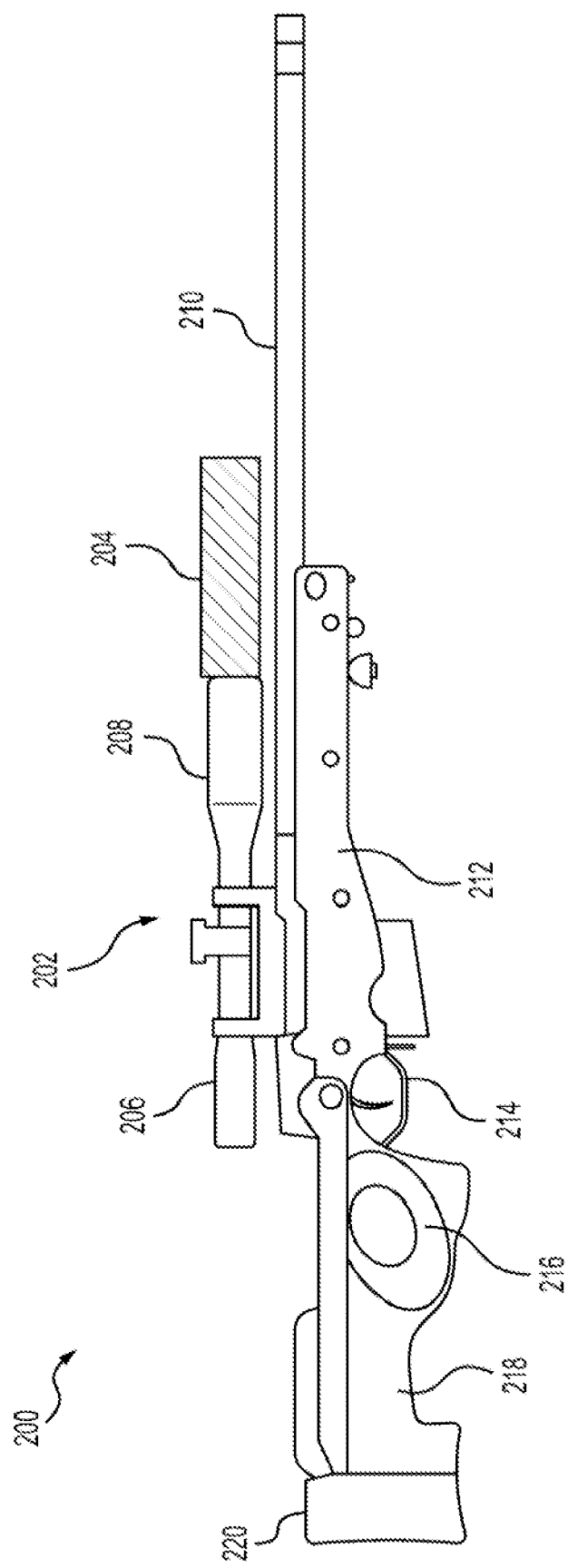
FIG. 2 is a schematic diagram of an example rifle connected to a parallax compensation system.

FIG. 2 is a schematic diagram of an example rifle 200 connected to a parallax compensation system 204. The rifle 200 includes a rifle scope 202, a barrel 210, a chamber 212, a trigger 214, a gripper 216, a stock 218, and a recoil pad 220. Rifle scope 202 is positioned above chamber 212 to allow a user to identify a remote object using rifle scope 202. Note rifle scope 202 is similar to rifle scope 122 of FIG. 1, including having similar components, such as a front optics 208 and a back optics 206. Moreover, a parallax compensation system 204 is connected to rifle scope 202 via front optics 208. Parallax compensation system 204 is like parallax compensation system 100 of FIG. 1, including having similar components for removing parallax error when imaging a remote object at rifle scope 202.

The components of parallax compensation system 204 are placed internally in this implementation. However, in other implementations, specific components, like onboard computer 104, may be external to parallax compensation system 204. If this is the case, parallax compensation system 204 and external components may have wireless capabilities to communicate with each other.

While rifle 200 is a specific rifle implementation, one may use other rifle implementations. Different rifle scopes may use parallax compensation system 204 beside rifle scope 202 shown in FIG. 2. Parallax compensation system 204 can be added as an external modular upgrade to any existing rifle scope which does not have parallax adjustment capabilities. There is no need for extensive internal modifications and/or a total redesign of the current rifle scope.

Figure 3:
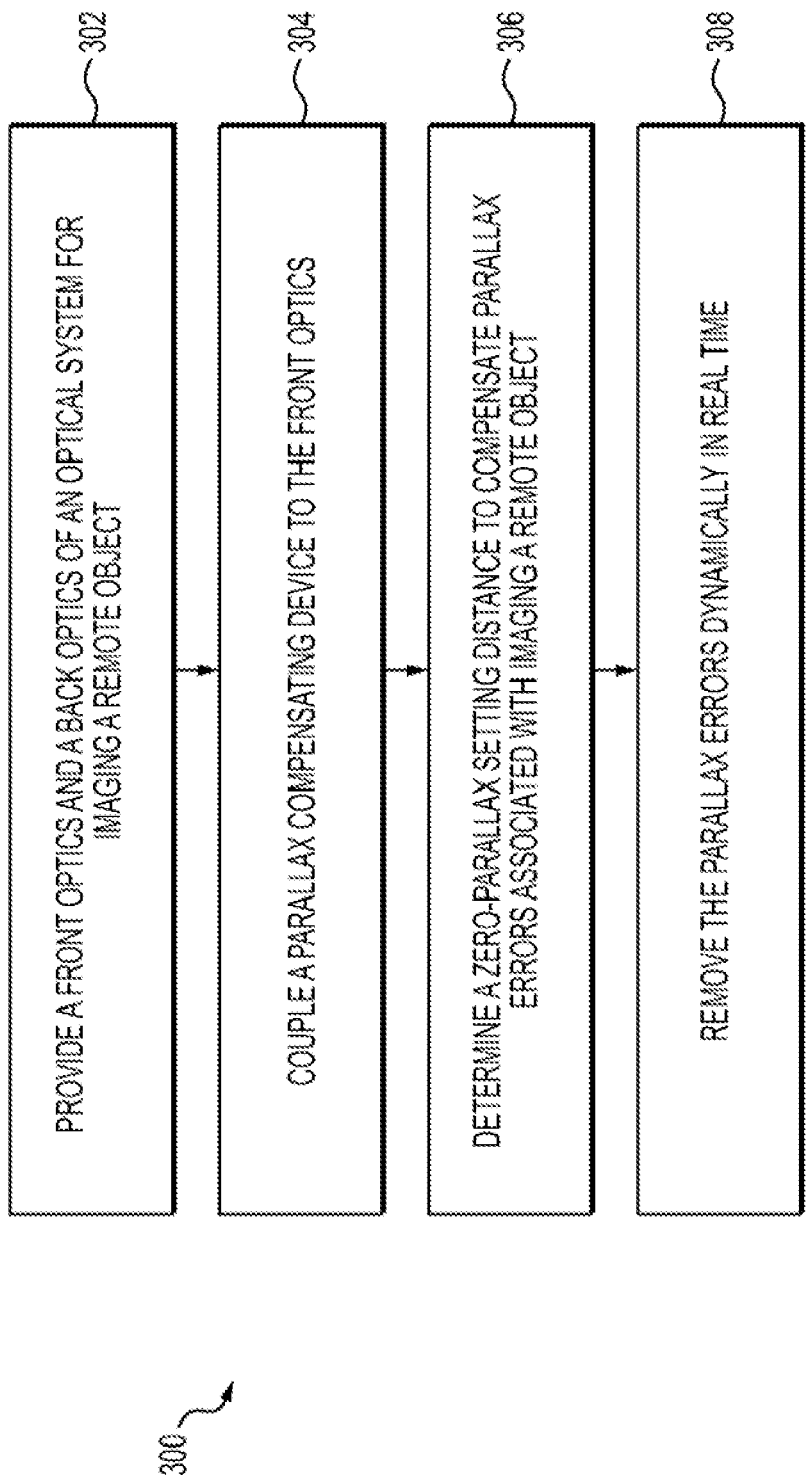
FIG. 3 is a process flowgraph of operations included in an example process for dynamic parallax compensation.

FIG. 3 is a process flowgraph of operations included in an example process 300 for dynamic parallax compensation. Process 300 includes providing a front optics (such as front optics 118, FIG. 1) and a back optics (such as back optics 120, FIG. 1) of an optical system (such as rifle scope 122, FIG. 1) for identifying and imaging a remote object (such as remote object 110, FIG. 1) (Step 302). Process 300 includes coupling a parallax compensating device to the front optics (Step 304). Process 300 includes determining, using the parallax compensating device, a zero-parallax setting distance (such as zero-parallax setting distance, FIG. 1) to compensate parallax errors associated with imaging a remote object (Step 306). Process 300 includes removing, using the zero-parallax setting distance, the parallax errors dynamically in real time even if a user is misaligned and temperature at the front optics or optical system changes (Step 308).

In some implementations, the front optics may include an objective lens and other lenses and/or prisms located between the objective lens and a reticule plane. The back optics may include an eyepiece. The front optics may include at least one temperature sensor for determining temperature data of the front optics or optical system.

In some implementations, the parallax compensating device may include a processing system to determine the zero-parallax setting distance based on target range data of the remote object, temperature data of the rifle scope surrounding environment, and calibrated data from at least one calibrated look-up table stored in the processing system. The parallax compensating device may include an external tunable optics module (TOM) having refractive plates. The TOM may be coupled to at least one actuator to move the refractive plates. The processing system may send signals to the at least one actuator to move the refractive plates to tune its refractive power to reflect the zero-parallax setting distance. The parallax compensation device may cancel both temperature dependent and temperature independent sources of the parallax error.

This disclosure explains a parallax compensating system and technique for adjusting parallax in rifle scopes and optical devices. This system has several benefits, including correcting both temperature-related and independent sources of parallax error and dynamically adjusting parallax in real time even if the user's eyes or head are not aligned or the temperature changes. Additionally, this system can be easily added to any existing scope or optical device without significant internal modifications or a complete redesign.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. A rifle comprising:
  a rifle scope including a front optics and back optics for imaging a remote object; and a parallax compensating device coupled to the rifle scope, the parallax compensating device determining a zero-parallax setting distance to compensate parallax errors associated with imaging a remote object, wherein the parallax compensating device removes, using the zero-parallax setting distance, the parallax errors dynamically in real time even if a user's head or eyes are misaligned and temperature at the rifle scope or rifle changes.

2. The rifle of claim 1, wherein the front optics comprises an objective lens and other lenses and/or prisms located between the objective lens and a reticule.

3. The rifle of claim 1, wherein the back optics comprise an eyepiece.

4. The rifle of claim 1, wherein the front optics comprises at least one temperature sensor for determining temperature data of the rifle scope or surrounding environment.

5. The rifle of claim 4, wherein the parallax compensating device comprises a processing system to determine the zero-parallax setting distance based on target range data of the remote object, temperature data of the rifle scope or rifle, and calibrated data from at least one calibrated look-table stored in the processing system.

6. The rifle of claim 5, wherein the parallax compensating device comprises external tunable optics module (TOM) having the refractive plates, wherein the TOM is coupled to at least one actuator to move the refractive plates.

7. The rifle of claim 6, wherein the processing system sends signals to the at least one actuator to move the refractive plates to tune a refractive power of the refractive plates to reflect the zero-parallax setting distance.

8. The rifle of claim 1, wherein the parallax compensation device cancels both temperature-dependent and temperature-independent sources of the parallax error.

9. A method for dynamic parallax compensation, the method comprising:
providing a front optics and a back optics of an optical system for imaging a remote object;
coupling a parallax compensating device to the front optics;
determining, using the parallax compensating device, a zero-parallax setting distance to compensate parallax errors associated with imaging a remote object; and
removing, using the zero-parallax setting distance, the parallax errors dynamically in real time even if a user is misaligned and temperature at the front optics or the optical system changes.

10. The method of claim 9, wherein the front optics comprises an objective lens and other lenses and/or prisms located between the objective lens and a reticule plane.

11. The method of claim 9, wherein the back optics comprise an eyepiece.

12. The method of claim 9, wherein the front optics comprises at least one temperature sensor for determining temperature data of the rifle scope or surrounding environment.

13. The method of claim 12, wherein the parallax compensating device comprises a processing system to determine the zero-parallax setting distance based on target range data of the remote object, temperature data of the rifle scope or rifle, and calibrated data from at least one calibrated look-table stored in the processing system.

14. The method of claim 13, wherein the parallax compensating device comprises external tunable optics module (TOM) having the refractive plates, wherein the TOM is coupled to at least one actuator to move the refractive plates.

15. The method of claim 14, further comprising sending signals, using the processing system, to the at least one actuator to move the refractive plates to tune a refractive power of the refractive plates to reflect the zero-parallax setting distance.

16. The method of claim 9, further comprising canceling, using the parallax compensation device, both temperature-dependent and temperature-independent sources of the parallax error.

17. A system for dynamic parallax compensation comprising:
a tunable optics module (TOM) for focusing at least one image of a remote target to a reticule plane of a front optics of an optical device, wherein the TOM comprises a plurality of refractive plates for tuning a refractive power of the TOM and is coupled to at least one actuator; and
a processing device for receiving data regarding the remote object and determining a zero-parallax setting distance from the received data to compensate for parallax error in imaging the remote object, where the processing device is configured to send signals to the at least one actuator to adjust the refractive plates for tuning the refractive power of the TOM to reflect the zero-parallax setting distance to compensate for the parallax error.

18. The system of claim 17, wherein the TOM is positioned on the front optics of the optical device.

19. The system of claim 17, wherein the processing device is an embedded processor.

20. The system of claim 17, wherein each of the refractive plates comprises a diffraction-limited surface.

* * * * *